United States Patent [19]

Petresh et al.

[11] 3,961,545
[45] June 8, 1976

[54] PARKING BRAKE CONTROL

[75] Inventors: Randall P. Petresh, Northville; Raymond F. Toohey, Lincoln Park, both of Mich.

[73] Assignee: Ford Motor Company, Dearborn, Mich.

[22] Filed: July 1, 1974

[21] Appl. No.: 484,895

[52] U.S. Cl. .................................. 74/517; 74/130
[51] Int. Cl.$^2$ .................................. G05G 1/04
[58] Field of Search ........... 74/29, 130, 517, 89.21; 254/66, 59, 95; 192/12 B, 12 BA

[56] References Cited
UNITED STATES PATENTS

| | | | |
|---|---|---|---|
| 2,251,893 | 8/1941 | Snell | 74/130 X |
| 2,868,887 | 1/1959 | Greshel | 192/12 BA |
| 2,869,394 | 1/1959 | Koehl | 74/517 X |

Primary Examiner—Samuel Scott
Assistant Examiner—Frank H. McKenzie, Jr.
Attorney, Agent, or Firm—Clifford L. Sadler; Keith L. Zerschling

[57] ABSTRACT

According to the present disclosure, a multi-stroke parking brake control has a pulley connected to a parking brake cable, a slidable actuating rod and connecting means constructed to drive the pulley when the rod is displaced. A gear is rotatably supported on the pulley and is in mesh engagement with a toothed rack formed on the rod. A one-way helical spring clutch drivingly interconnects the pulley and the gear in response to rotation of the gear caused by movement of the rod in a direction to tension the brake cable. A second one-way helical spring clutch interconnects the pulley and the housing and functions to hold the pulley in a brake applied condition. A release mechanism is arranged to release the second helical spring clutch to permit the pulley and cable to move to a released position under the force of a release spring. This construction of a parking brake control permits the actuating rod to be stroked a plurality of times to tension the brake cable as desired.

4 Claims, 3 Drawing Figures

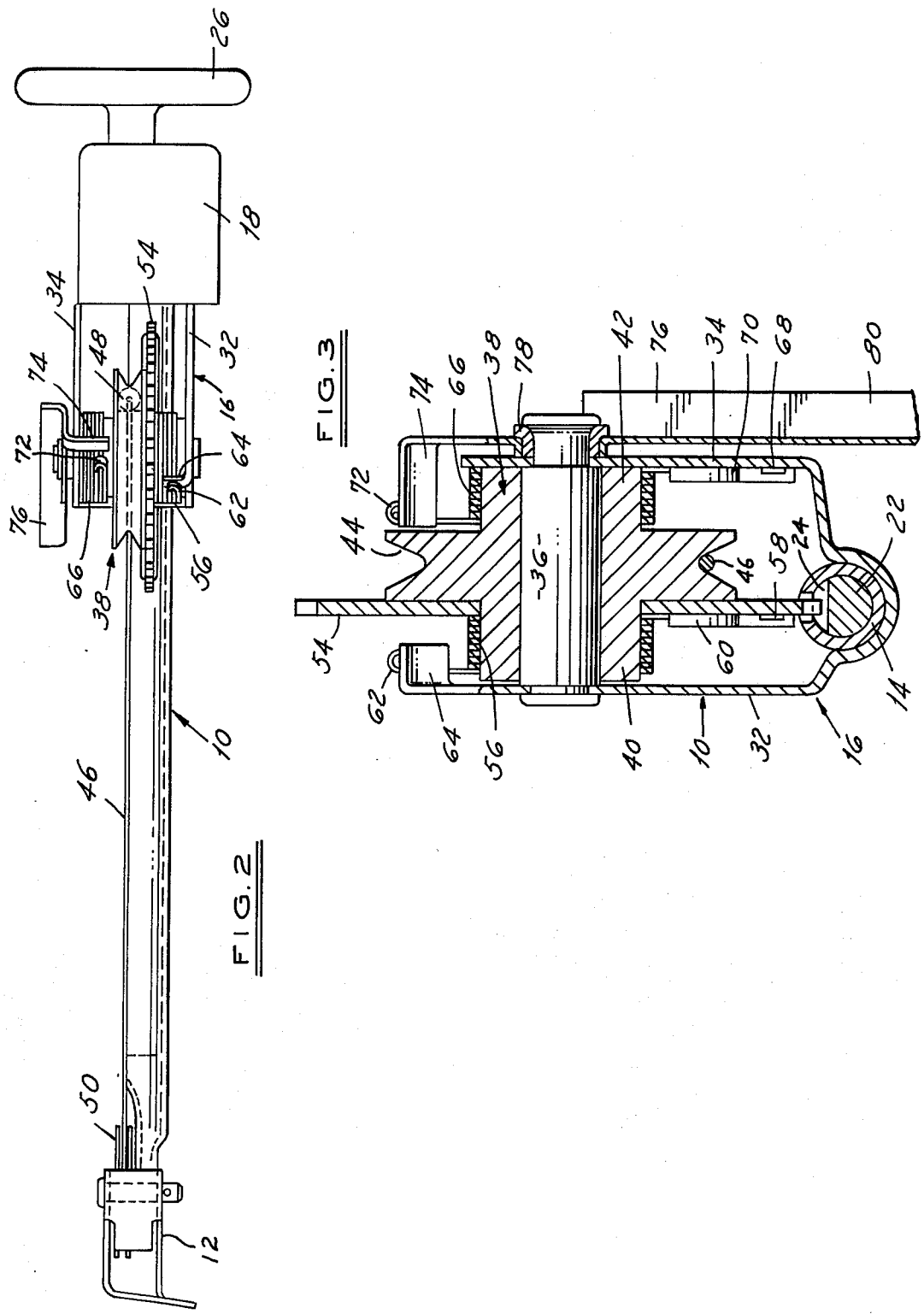

PARKING BRAKE CONTROL

BACKGROUND OF THE DISCLOSURE

In a conventional hand pull type of parking brake control for a motor vehicle a pull or actuating rod is directly connected to a parking brake cable The rod is provided with ratchet teeth that cooperate with spring pressed pawls that hold the rod in an extended brake applied position. To release the brake the rod is twisted to disengage the pawls to permit the rod to be moved forwardly whereby tension in the brake cable is relieved. Such devices permit only a single stroke and provide no mechanical advantage in tensioning the brake cable. Therefore, cable tension is limited, in part, by the length of the stroke.

The present invention provides an improvement in parking brake controls for motor vehicle brake systems. In order to improve the tensioning capability of mechanical brake actuating mechanisms while maintaining a desired level of operator effort, a parking brake control is provided having an actuating rod that may be stroked a plurality of times. The control of this disclosure permits a desirable high mechanical advantage ratio so that the parking brake cable may be properly tensioned while permitting operator effort upon the rod to be within acceptable limits.

BRIEF SUMMARY OF THE DISCLOSURE

In its presently preferred embodiment, this invention provides a parking brake control that includes an actuating rod slidably supported in a housing. A handle is affixed to the end of the rod and is located where it may be grasped by the vehicle operator. A pulley is rotatably supported in the housing and is connected to the end of a parking brake cable. A gear is rotatably supported on the pulley and is in mesh with a toothed rack formed on the actuating rod. The pulley has a first hub portion that is surrounded by a helical spring coil that functions as a one-way clutch. One end of the clutch coil is secured to the gear whereby the coil rotates with the gear. A second hub portion of the pulley supports a second helical spring coil type of one-way clutch. One end of the second coil is secured to the housing. The other end of the coil is situated adjacent the end of a brake release lever.

The first helical spring clutch coil is interposed between the gear and the pulley and is constructed (1) to form a driving connection between the gear and the pulley when the actuating rod is moved from an at rest position to a brake cable tensioning position and (2) to permit unrestricted rotation of the gear with respect to the pulley when the rod is returned from its cable tensioning position to its at rest position.

The second one-way helical spring clutch interconnects the pulley and housing and is constructed (1) to permit unrestricted rotation of the pulley with respect to the housing when the pulley is rotated in a direction to tension the brake cable and (2) to hold the pulley fast with the housing in a brake applied position when the vehicle operator releases the actuating rod and tension in the brake cable tends to rotate the pulley in the opposite direction. With this construction, the actuating rod may be returned to its at rest position when the brake cable is under tension in a brake applied condition.

A release mechanism is provided in association with the second spring clutch to permit disengagement of the interconnection between the pulley and the housing provided by the second clutch. The release mechanism is actuatable to permit the pulley and brake cable to return to the released position under the force of a return spring.

The preferred construction provides a parking brake control in which the actuating rod may be reciprocated or stroked a plurality of times by a vehicle operator until the parking brake cable is tensioned to a desired level.

BRIEF DESCRIPTION OF THE DRAWINGS

The many objects and advantages of a multi-stroke parking brake control for a motor vehicle that is constructed in accordance with this invention will become more apparent upon consideration of the following detailed discussion and the accompanying drawings, in which:

FIG. 2 is a top plan view of the parking brake control of FIG. 1; and

FIG. 3 is a sectional view taken along section lines 3—3 of FIG. 1.

DETAILED DESCRIPTION OF A PREFERRED EMBODIMENT

Figure 1:
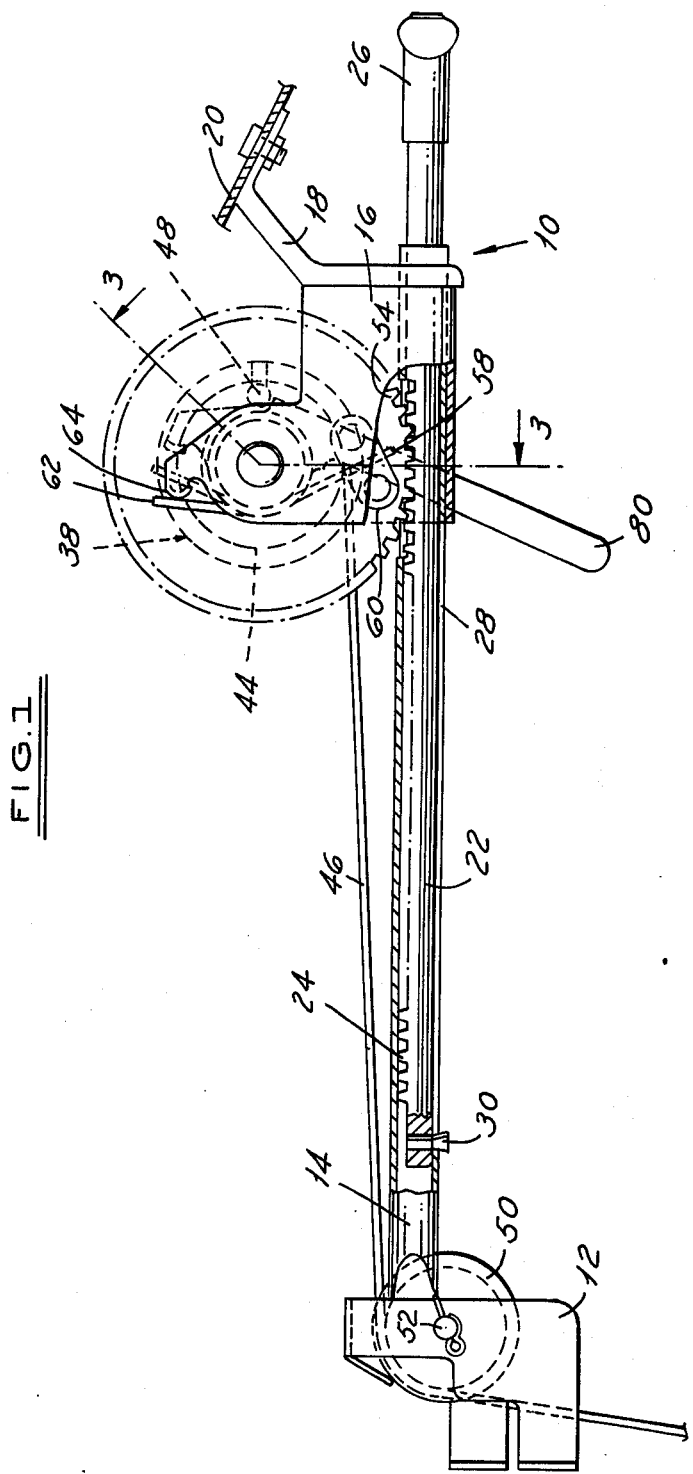
FIG. 1 is a side elevation view of the presently preferred embodiment of a new parking brake control.

Referring now to the drawings, wherein the presently preferred form of this invention is illustrated, FIG. 1 discloses a multi-stroke parking brake control 10 for a motor vehicle brake system. The parking brake control 10 includes a housing assembly having a forward housing part 12, a tubular housing part 14 and a rearward housing part 16. The forward housing part 12 may be supported by a bracket (not shown) under the instrument panel of a motor vehicle. The rearward housing part 16 includes a flange 18 that is bolted to an element 20 of the instrument panel.

An actuating or pull rod 22 is slidably supported within the tubular housing part 14. A series of gear teeth 24 are provided along the upper part of the rod 22 to form a toothed rack. A handle 26 is secured to the rearward end of the rod 22 and is located where it may be manipulated by a motor vehicle operator. A slot 28 is formed along the lower side of the tube 14. The rod 22 has an abutment pin or stop 30 that extends downwardly from the end of the rod and through the slot 28. The actuating rod 22 may be reciprocated within the tube 14 and the engagement of the abutment 30 with the fore and aft ends of the slot 28 determine the limits of travel of the rod.

The rearward housing 16 has a pair of side walls 32 and 34 that are interconnected by a pivot pin 36. A pulley 38 having first and second laterally extending hub portions 40 and 42 is rotatably supported on the pivot pin 36. The pulley 38 is provided with a groove 44 that supports a brake cable 46. The end of the cable 46 has a ball 48 swaged thereto and the ball is seated in a recess in the pulley 38. A second pulley 50 is rotatably supported by a pivot pin 52 in the forward housing part 12. The brake cable 46 extends over the pulley 50 and connects with the rear parking brakes of the vehicle.

In accordance with the present invention, means are provided for rotating the pulley 38 when the actuating rod 22 is reciprocated by the vehicle operator. A gear 54 is rotatably supported on the first hub portion 40 of the pulley 38. The teeth of the gear 54 are in mesh engagement with the teeth 24 of the rod 22. A helical spring coil 56 forms a one-way driving clutch and is snugly fitted about the hub portion 40 of the pulley 38. One end 58 of the clutch coil 56 is secured to the gear 54 by an anchoring plate 60. As seen in FIG. 1, the plate 60 is secured to the gear 54 by a pair of rivets. The second end 62 of the clutch coil 56 engages an abutment 64 formed on the left side wall 32 of the housing part 16 when the gear 54 and actuating rod 22 are in their brake released position. When the gear 54 is rotated by displacement of the rod 22, the clutch coil 56 will move with the gear 54 because its end 58 is secured thereto and the end 62 of the coil will move away from the abutment 64.

A second helical spring coil 66 forms a one-way holding clutch that is snugly fitted about the second hub portion 42 of the pulley 38. The clutch coil 66 has one free end 68 that is secured to the side wall 34 of the housing 16 by an anchoring plate 70. A second end 72 of the clutch coil 66 is juxtaposed an abutment 74 formed on the end of a brake release lever 76. The lever 76 is rotatably supported by a bushing 78 supported on the end of the pivot pin 36. A handle portion 80 extends downwardly from the lever 76 in a location where it may be gripped by the motor vehicle operator. A spring (not shown) may be connected to the lever 76 to hold the abutment 74 in spaced relationship with respect to the coil end 72.

OPERATION

The first clutch coil 56 is a one-way clutch which provides a driving connection between the gear 54 and the pulley 38 when the gear 54 is rotated in a cable tensioning direction (counterclockwise as seen in FIG. 1). The gear 54 is rotated in a cable tensioning direction by rearward displacement of the actuating rod 22 from its at rest position of FIG. 1 to an extended position. During a brake setting stroke of the actuating rod 22, the engagement of the abutment 30 with the end of the slot 28 in the housing 14 determines the limit of rearward rod movement. Upon counterclockwise rotation of the gear 54, the one-way clutch coil 56 will frictionally grip the hub portion 40 of the pulley 38 whereby the pulley 38 will be driven in a counterclockwise direction. The end 58 of the clutch coil 56 is secured to the gear and the coil is wrapped around the hub portion 40 in a direction whereby the clutch coil tightly grips the pulley hub when the gear 54 and clutch coil 56 are driven counterclockwise. Initial displacement of the gear 54 will cause the end 62 of the clutch coil 56 to move out of engagement with the stationary abutment 64.

As the pulley 38 is caused to be rotated by the gear 54 and the linear displacement of the actuating rod 22, the brake cable 46 will be wrapped about the pulley 38. Such action will tension the brake cable 46 and cause the brake shoes to move into engagement with the brake drum. If a single stroke of the actuating rod 22 does not tension the cable 46 to an extend necessary to set the brakes, the actuating rod 22 may be stroked a second time.

After the first stroke the handle 26 is returned to its forward position This will relieve the load on the first or driving one-way clutch coil 56. At the same time, the tendency of the pulley 38 to rotate clockwise under the tension of the cable 46 will be resisted by the second clutch coil 66 which functions as a holding clutch. The holding coil 66 will frictionally grip the hub portion 42 when the pulley tends to rotate in a clockwise direction as the coil wraps itself tightly about the hub 42.

When the actuating rod 22 is pushed inwardly into the housing 14, the one-way driving clutch coil 56 will be free to slide and rotate on the hub portion 40 due to the nature of its construction and particularly the direction in which the coil 56 is wound. When the rod 22 is displaced fully inwardly, it may be stroked rearwardly a second time by an appropriate force upon the handle 26. During the second stroke, the driving clutch coil 56 will once again grip the hub portion 40 causing the pulley 38 to rotate with the gear 54. As the pulley 38 is driven in a counterclockwise direction further to tension the cable 46, the hub portion 42 will slide within the holding clutch coil 66. There will be no gripping engagement during such relative movement.

When it is desired to release the parking brake, the vehicle operator grips the handle 80 and rotates the lever 76 until the abutment 64 engages and displaces the end 62 of the holding clutch coil 66. Such action causes the internal diameter of the clutch coil 66 to expand whereby it loses its gripping engagement with the hub portion 42 of the pulley 38. The tension in the brake cable 46 will cause the pulley 38 to rotate in a clockwise direction until the tension is relieved and the brake is released.

When the actuating rod 22 is in its forward position, the gear 54 will be rotated to its full clockwise position in which the coil end 62 engages the abutment portion 64 of the housing. This will expand the internal diameter of the one-way driving clutch 56 and will assure the complete disengagement of that clutch. In other words when the free end 62 of the driving clutch 56 engages the abutment 64, the pulley 38 will be free to rotate either clockwise or counterclockwise with respect to the driving clutch coil 56 and the gear 54.

In summary the present invention provides a parking brake control in which a linearly displaceable actuating rod is moved from a released position to a brake setting position causing a gear to be rotated. A one-way driving clutch automatically couples the gear with a pulley, which is connected to the brake cable, when the gear is rotated in a brake setting direction. A holding one-way clutch secures the pulley against rotation relative to the housing when the brake cable is under tension.

The construction permits the actuating rod to be stroked a plurality of times in order to tension the cable as desired.

The foregoing description presents the presently preferred embodiment of the invention. Details of construction are shown and described for purposes of illustration and are not to be considered the limits of the invention. Modifications and alterations may occur to those skilled in the art which will come within the scope and spirit of the following claims.

We claim:

1. A multi-stroke parking brake control for a motor vehicle comprising a housing and an actuating rod slidably supported in said housing, said actuating rod being linearly displaceable between an at rest position and a cable tensioning position, said actuating rod having a handle constructed to be manipulated by a motor vehicle operator, said actuating rod having a toothed rack formed along a portion of its length, a driving member having a pulley portion constructed to be connected to a brake cable, said driving member being rotatably supported on said housing and angularly displaceable in a cable tensioning direction and in a tension relieving direction, said driving member having first and second drum-like hub portions, a gear rotatably supported on said first hub portion and having teeth in mesh engagement with said toothed rack of said actuating rod, said gear being angularly displaced in a first direction when said actuating member is displaced from said at rest position to said cable tensioning position, a first one-way clutch comprising a first helical spring coil disposed about said first hub portion and having one end secured to said gear, said first coil being constructed to grip said first hub portion when said gear is rotated in said first direction and to slidably engage said first hub portion when said gear is rotated in said second direction, a second one-way clutch comprising a second helical spring coil disposed about said second hub portion of said driving member and having one end secured to said housing, said second coil being constructed to grip said second hub portion when said driving member is rotated in said tension relieving direction and to slidably engage said second hub portion when said driving member is rotated in said cable tensioning direction, said gear being angularly displaceable in a second direction when said actuating member is displaced from said cable tensioning position to said at rest position, said second coil having a second free end, a release lever having a portion constructed to engage said free end of said second coil and to displace said second coil whereby said second hub portion slidably engages said second coil when said second hub portion is angularly displaced in said tension relieving direction.

2. A control mechanism for a motor vehicle brake comprising a housing and a manually operated linearly displaceable actuating member slidably supported in said housing, a driving member constructed to engage a brake cable, said driving member being angularly displaceable in a cable tensioning direction and in a tension relieving direction, said actuating member being constructed to be displaced from an at rest position to a cable tensioning position by the application of a force thereto, an intermediate member angularly displaceable with respect to said driving member, means forming a driving connection between said actuating member and said intermediate member, said intermediate member being displaced in a first direction when said actuating member is displaced from said at rest position to said cable tensioning position, said intermediate member being displaced in a second direction when said actuating member is displaced from said cable tensioning position to said at rest position, a first one-way clutch operatively interposed between said driving member and said intermediate member, said first one-way clutch comprising a helical spring coil disposed about a cylindrical portion of said driving member and having one end secured to said intermediate member, said first one-way clutch being constructed to provide a driving connection between said driving member and said intermediate member in response to displacement of said intermediate member in said first direction, said coil being constructed to grip said cylindrical portion of said driving member when said intermediate member is angularly displaced in said first direction and slidably engage said cylindrical portion when said intermediate member is angularly displaced in said second direction, a second one-way clutch operatively interposed between said housing and said driving member, said second one-way clutch being constructed to normally hold said driving member against angular displacement in said tension relieving direction in response to a tensile load in said cable, release means engageable with said second one-way clutch and constructed to disengage said second one-way clutch from said driving member to permit said driving member to be angularly displaced in said tension relieving direction.

3. A control mechanism for a motor vehicle brake comprising a housing and a manually operated linearly displaceable actuating member slidably supported in said housing, a driving member constructed to engage a brake cable, said driving member being angularly displaceable in a cable tensioning direction and in a tension relieving direction, said actuating member being constructed to be displaced from an at rest position to a cable tensioning position by the application of a force thereto, an intermediate member angularly displaceable with respect to said driving member, means forming a driving connection between said actuating member and said intermediate member, said intermediate member being displaced in a first direction when said actuating member is displaced from said at rest position to said cable tensioning position, said intermediate member being displaced in a second direction when said actuating member is displaced from said cable tensioning position to said at rest position, a first one-way clutch operatively interposed between said driving member and said intermediate member, said first one-way clutch being constructed to provide a driving connection between said driving member and said intermediate member in response to displacement of said intermediate member in said first direction, a second one-way clutch operatively interposed between said housing and said driving member, said second one-way clutch comprising a helical spring coil disposed about a cylindrical portion of said driving member and having one end secured to said housing, said second one-way clutch being constructed to normally hold said driving member against angular displacement in said tension relieving direction in response to a tensile load in said cable, said coil being constructed to grip said cylindrical portion when said driving member is angularly displaced in said tension relieving direction and to slidably engage said cylindrical portion when said driving second hub member is angularly displaced in said cable tensioning direction, release means engageable with said second one-way clutch and constructed to disengage said second one-way clutch from said driving member to permit said driving member to be angularly displaced in said tension relieving direction, said release means having a portion constructed to engage the other end of said coil and to displace said coil whereby said cylindrical portion slidably engages said coil when said cylindrical portion is rotated in said tension relieving direction.

4. A multi-stroke parking brake control for a motor vehicle comprising a housing and an actuating rod slidably supported in said housing, said actuating rod being linearly displaceable between an at rest position and a cable tensioning position, said actuating rod having a handle constructed to be manipulated by a motor vehicle operator, said actuating rod having a toothed rack formed along a portion of its length, a pulley constructed to be connected to a brake cable, said pulley being rotatably supported on said housing and angularly displaceable in a cable tensioning direction of rotation and in a tension relieving direction of rotation, said pulley having first and second drumlike hub portions, a gear rotatably supported on said first hub portion and having gear teeth in mesh engagement with said toothed rack of said actuating rod, said gear being angularly displaced in a first direction of rotation when said actuating rod is displaced from said at rest position to said cable tensioning position and in a second direction of rotation when said actuating rod is displaced from said cable tensioning position to said at rest position, a first one-way clutch comprising a first helical spring coil disposed about said first hub portion and having one end secured to said gear, said first coil being constructed to grip said first hub portion when said gear is rotated in said first direction and to slidably engage said first hub portion when said gear is rotated in said second direction, said first spring coil having a free end engaging said housing when said rod is in said at rest position whereby said first one-way clutch is disengaged and said pulley is free to rotate in both said cable tensioning direction and said tension relieving direction relative to said gear, a second one-way clutch comprising a second helical spring coil disposed about said second hub portion of said pulley and having one end secured to said housing, said second coil being constructed to grip said second hub portion when said pulley is rotated in said tension relieving direction and to slidably engage said second hub portion when said pulley is rotated in said cable tensioning direction, said second coil having a second free end, a release lever having a portion constructed to engage said free end of said second coil and to displace said second coil whereby said second one-way clutch is disengaged and said pulley is free to rotate both directions of rotation relative to said housing.

* * * * *